Feb. 4, 1930.  P. P. ALEXANDER  1,746,209
METHOD AND APPARATUS FOR ELECTRIC ARC WELDING
Filed Oct. 7, 1925
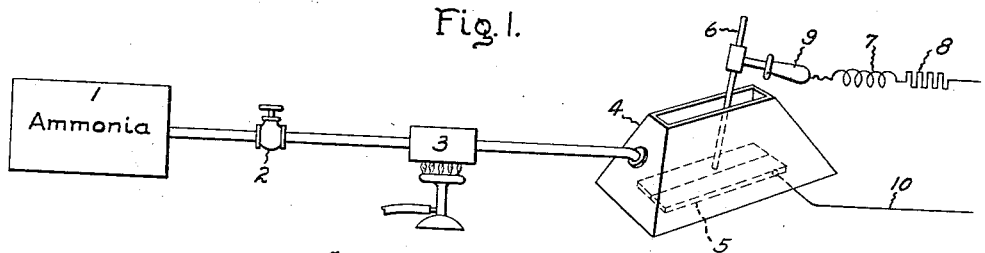
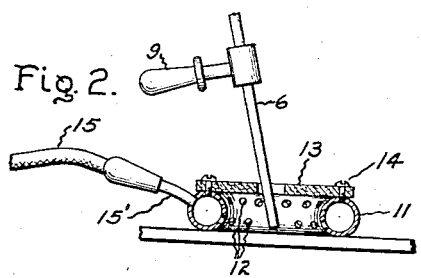
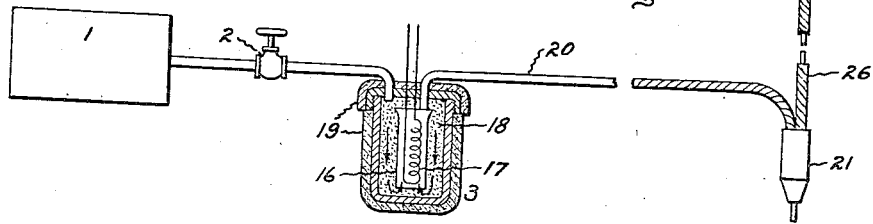
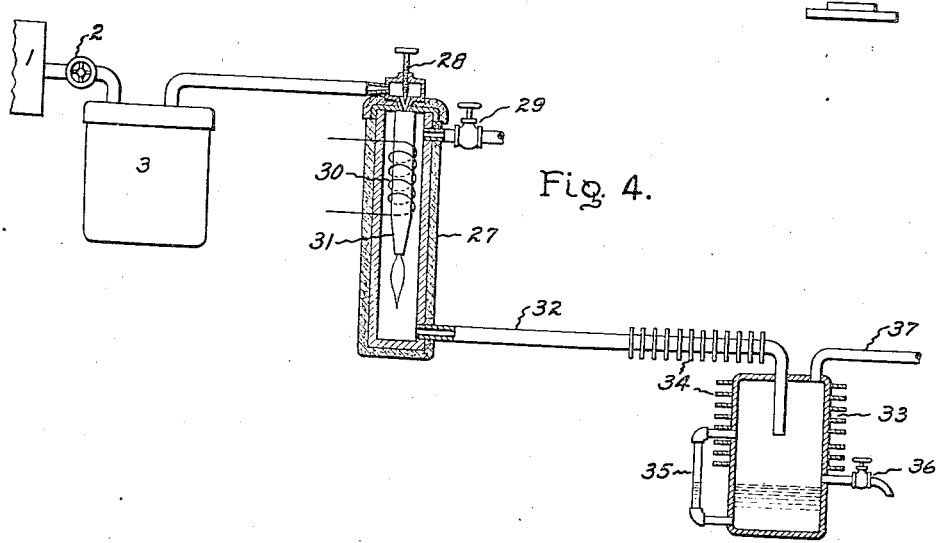
Inventor
Peter P. Alexander,
by
His Attorney.

Patented Feb. 4, 1930

1,746,209

UNITED STATES PATENT OFFICE

PETER P. ALEXANDER, OF MARBLEHEAD, MASSACHUSETTS, ASSIGNOR TO GENERAL ELECTRIC COMPANY, A CORPORATION OF NEW YORK

METHOD AND APPARATUS FOR ELECTRIC-ARC WELDING

Application filed October 7, 1925. Serial No. 61,120.

My invention relates to electric arc welding, and particularly to improvements in methods and apparatus for carrying out such welding in a gaseous medium. Objects of my invention are to provide improvements whereby a suitable gaseous medium or mixture for producing sound, ductile, and reliable welds may be simply and economically produced, and whereby the proportions of the constituents of the gaseous mixture may be simply and economically controlled to suit various welding conditions.

It has been found possible to produce ductile welds in a medium containing nitrogen if a sufficient amount of an active reducing gas such as hydrogen be present to neutralize the tendency of nitrogen in the presence of small amounts of oxygen to produce compounds which render the weld metal brittle. Such welding is disclosed and claimed in the joint application of Irving Langmuir and myself, Serial Number 54,637, filed September 5, 1925, for methods and apparatus for electric arc welding, assigned to the same assignee as the present application.

One of the characteristic features of welding with a hydrogen-nitrogen mixture is the ease with which the heat and rate of metal deposition may be controlled. The arc voltage and speed of welding varies in proportion to the percentage of hydrogen present. With about 75% of hydrogen the voltage drop across the arc under usual operating conditions is from 40 to 50 volts, although the upper limit is not fixed, and the arc may be struck and maintained from a source whose open circuit voltage is about 75 volts. A source suitable for welding in air may, therefore, be used. This mixture will give a high speed of welding or of cutting. By reducing the hydrogen to about 20 to 25% of the total gas mixture conditions approaching those of welding in air may be secured with respect to arc voltage. In this mixture the arc is very quiet and the arc voltage is about the same is in air. By increasing the nitrogen content in the mixture the flame can be rendered almost invisible and, in fact, with a sufficiently high nitrogen content the mixture becomes incombustible. Such mixtures can be used to great advantage for overhead work for the flame produced by the burning hydrogen does not then interfere with the workman's vision. The resulting lower voltage with such mixtures also gives an arc length and rate of deposition that is better for overhead work.

The process of welding in the hydrogen-nitrogen mixture is of particular utility in the welding of certain alloys which tend to absorb hydrogen and becomes porous. Welds with nickel-chromium alloys have been very successfully made and it has been found to be a good mixture for depositing stellite onto backing pieces to provide a hard wearing or cutting surface for a die or tool.

According to my present invention the gaseous medium of hydrogen and nitrogen is supplied by dissociating ammonia ($NH_3$). Ammonia is a cheap, commercial product sold in a liquefied compressed state. A tank of 100 lbs. of liquefied ammonia will produce 2249 cu. ft. of gas at normal pressure and a temperature of 20° C. This gas when dissociated produces a mixture of 75% hydrogen and 25% of nitrogen which will occupy at 20° C. a volume of 4498 cu. ft. By preheating this gas in the welding torch or at any other suitable place to about 300° C. this volume may be doubled again. A small and readily portable tank will be sufficient for several weeks of welding. Synthetic ammonia is a common article of commerce and the present cost does not exceed 30 cents per lb. of liquid ammonia. The production of liquid ammonia throughout the world is many thousands of tons daily. Thus it will be seen that a convenient and unlimited source of a cheap supply is available for welding in a hydrogen-nitrogen atmosphere.

It is preferable to dissociate the ammonia before conducting it to the welding arc although if this is not done the vapor will be dissociated by the arc itself. Because of the physiological characteristics of ammonia, a small amount of escaping ammonia vapor may make it uncomfortable for the operator to carry on the work. By dissociating the vapor before it reaches the air this objection is overcome. When once dissociated, the gaseous mixture does not re-combine on standing and the gas may, therefore, be compressed and stored for future use if desired.

In order to be able to deliver various percentages of nitrogen from 25% up, I provide a burner to mix air with the mixture of hydrogen and nitrogen resulting from the decomposition of ammonia. The oxygen in the air combines in the burner with a portion of the hydrogen present in the mixture to give a resulting gas that is a mixture of nitrogen, hydrogen and water vapor. The water vapor may be removed by any suitable means as, for example, a condenser. It is preferable to reduce the amount of water vapor and when relatively high percentages of nitrogen are used it is preferable absolutely to eliminate the water vapor.

My invention may be used for manual, semi-automatic or full automatic arc welding with either alternating or direct currents. Where a fusible metallic electrode is used I prefer to use direct current and make the work positive and the electrode negative. In manual arc welding the operator, by the aid of a suitable electrode holder, strikes and maintains the arc manually. In semi-automatic arc welding means are provided for automatically feeding the electrodes to compensate for its consumption and in full automatic arc welding the electrode is not only automatically fed to compensate for its consumption but automatic means are provided for producing relative movement between the arc and the work along the line of the joint to be welded. While my invention is particularly applicable to welding of the type wherein metal is deposited from a fusible electrode such as an iron or steel electrode, it is also applicable where a carbon electrode is used. My invention is also applicable in its broader aspects to arc welding systems in which the arc is maintained between a plurality of electrodes instead of between an electrode and the work to be welded and a non-consuming electrode may be used if desired. My invention will be better understood from the following description taken in connection with the accompanying drawing and its scope will be pointed out in the appended claims.

In the drawing Fig. 1 diagrammatically represents my invention as applied to manual arc welding; Fig. 2 shows a modification of a part of the apparatus shown in Fig. 1; Fig. 3 shows how my invention is applied to automatic or semi-automatic arc welding and shows in section one type of dissociater that may be used; and Fig. 4 shows a mixing burner and condenser for controlling the mixture of gases supplied to the welding arc.

In Fig. 1, ammonia gas is released from the container 1 through a valve 2 into a dissociater 3. This dissociater may be of any convenient type. It may consist of a piece of pipe filled with iron filings or the equivalent and heated to approximately a red heat by suitable means. The heating means shown in Fig. 1 is a Bunsen burner. From this dissociater the hydrogen-nitrogen mixture resulting from the decomposition of ammonia is conducted to a hood 4, which surrounds the work 5, or a portion thereof, and the electrode 6. The electrode 6 may be either a metallic or a carbon electrode and as indicated is connected to one side of a supply circuit through a reactor 7 and a resistor 8. The electrode is indicated as held in a suitable holder 9 adapted to be manipulated to cause the arc to be established and maintained between the electrode and the work during the welding operation. The lead 10 is shown for connecting the work to the other side of the supply circuit. In order to simplify the drawing the source is not shown but it may be a constant potential source where a series stabilizing resistor such as 8 is used. The source, however, may be an inherently regulated generator which may supply the arc without the use of a stabilizing resistor. During welding with a combustible mixture the gas burns in contact with atmosphere air for a short distance above the opening in the top of hood through which the welding electrode 6 extends toward the work.

Fig. 2 shows an appliance which may be used with advantage on many classes of work in place of the hood 4 of Fig. 1. It comprises a substantially annular member adapted to be placed adjacent the work and about the arc and molten portions of the work. By substantially annular I mean of any convenient geometric configuration so long as the member substantially encloses the arc and molten portions of the work. The appliance is shown as a ring 11 provided with at least 2 rows of holes 12 with the holes staggered, one row of holes directing the gas mixture downwardly and the other row directing it slightly upwardly. This arrangement is effective in preventing the admixture of atmospheric air. The ring is provided with a cover 13 of asbestos or the like secured to the ring 11 by screws 14 and provided with an opening through which the electrode is manipulated. The gas mixture is supplied to the appliance through a flexible tube 15 and a pipe 15′ provided with a handle. As this part of the welding apparatus will be subjected to a great deal of rough handling, it is generally desirable to make it simple and rugged. It is also advantageous to make the ring of copper for the reason that particles settling on the ring from the arc will not readily stick to copper and any such deposit may be easily brushed off. If it is desired to use the ring as a dissociater for a pungent vapor such as ammonia, it will be preferable to fill the ring with a catalyst such as iron filings and provide it with a heating element such as a nichrome wire connected to a suitable heating circuit, the heating element being insulated from the iron filings by a suitable refractory material. In case the ring is used as a dissociater the medium to be dissociated may be supplied directly thereto through flexible tube 15.

Fig. 3 shows my invention applied to automatic or semi-automatic arc welding and shows in section one type of dissociater that may be used. In this figure a suitable source of ammonia is indicated at 1. Ammonia is admitted from this source of supply through a valve 2 into the dissociater 3. This dissociater comprises an inner tube 16 containing a nichrome heating element 17. Surrounding this tube and within the dissociater 3 there is a suitable catalyst, for example, porous iron, iron filings or the like, 18. The whole device is preferably enclosed in an asbestos or equivalent covering 19 to economize heat. The ammonia gas is passed from valve 2 down through the catalyzer 18, which is kept hot by the nichrome heating element, then up through the tube 16 which is illustrated as containing the heating element and out through the tube 20 to the welding tool 21 of an automatic or semi-automatic welding machine. In this figure the electrode 22 is indicated as being drawn from a reel 23 by feed rollers 24 driven by any suitable means. The feed rollers are mounted in a suitable welding head 25. The electrode is delivered from the rolls 24 to the tool 21 by a flexible conduit 26.

In the semi-automatic type of apparatus the operator manually holds or guides the welding device or tool over the work to be welded and the automatic means feeds the metallic electrode from the tool toward the work to maintain the arc. In such apparatus the rate at which the electrode is fed may be automatically regulated to maintain the arc length substantially constant. Such a construction and method of feeding the electrode is shown in Letters Patent to Noble 1,508,711, dated September 16, 1924. To convert such apparatus into a fully automatic machine it is merely necessary to provide a suitable means for automatically producing relative movement between the electrode and the work along the line of the joint to be welded. The electrode will thus not only be fed automatically to maintain the arc, but the movement along the joint to be welded will also be effected automatically.

In Fig. 4 I have shown a burner and a condenser inserted between the dissociater and the welding tool by means of which I am able to deliver to the arc percentages of nitrogen from 25% up. The 75-25% gas mixture of hydrogen and nitrogen comes from the dissociater 3 and enters the burner 27 through needle valve 28. The burner 27 comprises a heat insulated container to which various amounts of air may be admitted or drawn through a valve 29. The oxygen of the air combines with double its volume of hydrogen, producing water vapor and the nitrogen which forms about 80% of atmospheric air is added to the nitrogen which is delivered from the dissociater. This combination or burning may be started by suitable sparking electrodes in the mixture examples of which are well known in processes for the fixation of atmospheric nitrogen. In the arrangement shown I have indicated a nichrome heater 30 surrounding a tube 31 through which the hydrogen-nitrogen mixture is delivered from the dissociater. This heating element may be located in any position where it will impart sufficient heat to ignite the mixture which ignites at a moderate temperature. The flash point of hydrogen in the presence of sufficient oxygen is 294° C. but if the hydrogen is greatly diluted with nitrogen this flash point will be considerably higher. I have found temperatures of 800 to 1000° C. to be satisfactory. Even lower temperatures may be sufficient, for example, 600 to 800° C.

A small amount of water vapor will not destroy the success of my welding process but it is preferable not to have any considerable amount of water vapor present and when relatively high percentages of nitrogen are used it is desirable to eliminate the water vapor. As shown in the figure the mixture of hydrogen, nitrogen and water vapor is conducted through a pipe 32 to a condenser 33. In the drawing the pipe and condenser are indicated as provided with cooling fins or ribs 34. It will be understood that any suitable arrangement may be used for separating out the water vapor. The condenser chamber shown is indicated as provided with a gauge glass 35 and an overflow valve 36 which may be opened wherever the gauge indicates that the condenser is filling up. From the top of the condenser a hydrogen-nitrogen mixture is delivered through the conduit 37 to a welding tool such as that shown at 21 in Fig. 3 or to a hood or other suitable appliance such as shown in Fig. 2.

The burner just described may also be used with a supply of hydrogen or equivalent gas which will combine with the oxygen of the air to produce a suitable mixture of nitrogen and active reducing gas.

When ammonia has once been dissociated the gaseous mixture does not recombine on standing and the gases may therefore be compressed and stored away for future use if so desired. Likewise, where the nitrogen content of a mixture is increased as just indicated the gas taken from the condenser may be used directly or stored for future use.

It is apparent to those skilled in the art that a suitable storing means or gasometer may be located at any convenient place in the delivery pipe of the gas supplying means. Such a gasometer may be located in the pipe line 20 of Fig. 3 or in lines 32 or 37 of Fig. 4. It is also apparent that one gas producing plant may be sufficient for several welding equipments. A device such as that shown in Fig. 2 may be used where the electrode is automatically fed as in Fig. 3.

While ammonia ($NH_3$) is a cheap single chemically pure product, and is not of a complex nature, and dissociates to produce a gaseous mixture suitable for the production of ductile welds, it is to be understood that from a broader aspect my invention contemplates the dissociation of other compounds of the ammonia series. For example, tri-methyl ammonia—$N(CH_3)_3$—may be dissociated to produce a mixture of nitrogen and hydrogen with some free carbon. Compounds of the series which are liquid may be vaporized before being supplied to the arc, and where a deleterious excess of carbon results from dissociation, the deleterious effect may be neutralized by the admixture of a suitable compound, for example carbon dioxide or water vapor, thereby producing a gaseous mixture containing carbon monoxide. Carbon monoxide is an active reducing gas, and may be used to produce ductile welds with or without the admixture of hydrogen, as disclosed and claimed in the application of Elihu Thomson, Serial No. 52,680, filed August 26, 1925, for electric welding, and assigned to the same assignee as the present application.

The application of Irving Langmuir, Serial No. 729,185, filed July 30, 1924, for heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when my invention is used, I make no claim to such subject matter since the Langmuir invention is earlier than my invention.

What I claim as new and desire to secure by Letters Patent of the United States, is:

1. The method of fusing metals by the electric arc process which comprises producing an arc, dissociating ammonia vapor and operating with the arc and fused metal enveloped in the dissociation products thus produced.

2. The method of electric arc welding which comprises producing an arc, supplying ammonia vapor, dissociating the vapor and surrounding the arc and molten portions of the work with the resultant gaseous medium.

3. The method of electric arc welding which comprises producing an arc, dissociating a compound of the ammonia series and supplying the resulting gaseous mixture to surround the arc and molten portions of the work.

4. The method of electric arc welding in a gaseous mixture containing nitrogen and hydrogen which comprises producing an arc, dissociating ammonia vapor to produce a mixture of nitrogen and hydrogen, burning atmospheric air in the mixture to produce a mixture containing nitrogen, hydrogen and water vapor, separating out the water vapor and surrounding the arc and molten portions of the work with the resultant gaseous mixture.

5. The method of electric arc welding in a gaseous mixture containing nitrogen and hydrogen which comprises producing an arc, dissociating ammonia vapor to produce a mixture of nitrogen and hydrogen, burning atmospheric air in the mixture to increase its nitrogen content and surrounding the arc and molten portions of the arc with the resulting gaseous medium.

6. The method of fusing metals by the electric arc process which comprises producing an arc, burning atmospheric air in an excess of hydrogen and supplying the mixture of nitrogen and hydrogen thus produced to surround the arc and molten metal.

7. In the art of fusing metals by the electric arc process wherein a gaseous mixture comprising nitrogen and an active reducing gas surrounds the arc and molten metal, the method of controlling the nitrogen content of the medium which comprises burning atmospheric air in hydrogen.

8. The method of electric arc welding which comprises maintaining the arc and molten portions of the work in a reducing gaseous medium diluted with inert gas, burning atmospheric air in a medium which combines with the oxygen of the air and supplying atmospheric nitrogen thus produced to further dilute said gaseous medium surrounding the arc and molten portions of the work.

9. Apparatus for electric arc welding in a gaseous medium comprising a source of ammonia, means for dissociating the ammonia into its constituent elements and means for supplying the resulting gaseous mixture around the arc and molten portions of the work.

10. Apparatus for fusing metals in an active reducing gaseous medium comprising means for fusing metals by the electric arc process, means for dissociating ammonia and means for supplying the resulting gaseous mixture around the arc and molten metal.

11. Apparatus for electric arc welding in a gaseous medium of hydrogen and nitrogen, which comprises means for dissociating the ammonia, means for burning the resulting gaseous mixture in the presence of a predetermined amount of air to increase its nitrogen content, means for separating out water vapor resulting from such combustion, and means for supplying the medium about the arc and molten portions of the work.

12. Apparatus for electric arc welding in a gaseous medium of nitrogen and an active reducing gas comprising means for supplying nitrogen and reducing gas and means for controlling the nitrogen content of the mixture including means for burning a medium which will combine with the oxygen of the air in a container to which a predetermined amount of air is admitted.

13. Apparatus for electric arc welding in an active reducing atmosphere of hydrogen and nitrogen which comprises means for dissociating ammonia means for burning the resulting gaseous mixture in a limited supply of air to vary its nitrogen content and means for supplying the then resulting mixture about the arc and molten portions of the work.

14. Apparatus for fusing metals in a gaseous medium by the electric arc process, comprising a source of gaseous mixture and means for diluting the gaseous mixture with atmospheric nitrogen including means for burning a medium which will combine with the oxygen of the air in a container to which air is admitted in predetermined quantities.

15. Apparatus for fusing metal in a gaseous medium by the electric arc process, comprising means for dissociating a material into gaseous constituents and means for supplying the resulting gaseous mixture from said dissociating means to surround the arc and molten metal.

16. Apparatus for electric arc welding in a gaseous medium comprising a source of material dissociable to produce a gaseous mixture means for dissociating said material into its constituent elements and means for supplying the resulting gaseous mixture about the arc and molten portions of the work.

In witness whereof, I have hereunto set my hand this fifth day of October, 1925.

PETER P. ALEXANDER.